US010726842B2

(12) United States Patent
Lambourne et al.

(10) Patent No.: US 10,726,842 B2
(45) Date of Patent: Jul. 28, 2020

(54) CAPTION DELIVERY SYSTEM (71) Applicant: The Royal National Theatre, London (GB)

(72) Inventors: Andrew D. Lambourne, St Albans (GB); Paul F. Ranson, Brackley (GB)

(73) Assignee: THE ROYAL NATIONAL THEATRE, London (GB)

(*) Notice: Subject to any disclaimer, the term of this patent is extended or adjusted under 35 U.S.C. 154(b) by 25 days.

(21) Appl. No.: 15/787,175

(22) Filed: Oct. 18, 2017

(65) Prior Publication Data
US 2019/0096407 A1 Mar. 28, 2019

(30) Foreign Application Priority Data

Sep. 28, 2017 (GB) .................................. 1715753.8
Oct. 2, 2017 (GB) .................................. 1716076.3

(51) Int. Cl.
G10L 15/26 (2006.01)
G11B 27/031 (2006.01)
G11B 27/34 (2006.01)

(52) U.S. Cl.
CPC .......... *G10L 15/265* (2013.01); *G11B 27/031* (2013.01); *G11B 27/34* (2013.01)

(58) Field of Classification Search
None
See application file for complete search history.

(56) References Cited

U.S. PATENT DOCUMENTS

| 5,648,789 | A | 7/1997 | Beadles et al. | |
| 6,490,553 | B2 * | 12/2002 | Van Thong | H04N 5/278 348/E5.06 |
| 6,754,438 | B1 * | 6/2004 | Matoba | G11B 27/10 348/E7.031 |
| 9,870,134 | B2 * | 1/2018 | Threewits | G09B 19/00 |
| 2002/0143531 | A1 * | 10/2002 | Kahn | G10L 15/26 704/235 |
| 2003/0004966 | A1 * | 1/2003 | Bolle | G06F 16/58 |
| 2003/0033174 | A1 * | 2/2003 | Ikeda | G06Q 10/02 705/5 |

(Continued)

FOREIGN PATENT DOCUMENTS

AU 2007100441 A4 6/2007
AU 2011100285 A4 6/2011

(Continued)

OTHER PUBLICATIONS

International Search Report and Written Opinion, PCT/EP2018/076384, dated Dec. 19, 2018.

*Primary Examiner* — Jonathan C Kim
(74) *Attorney, Agent, or Firm* — Winston & Strawn LLP (57) ABSTRACT A system and method of delivering an information output to a viewer of a live performance. The information output can be displayed text or an audio description at predefined times in the live performance relative to stage events. A follower script with entries organised along a timeline, and metadata at time points between at least some of the entries is generated. The metadata is associated with stage events in the live performance. The system uses speech recognition to track spoken dialogue against the entries in the follower script, and the stage events, to aid in following the live performance.

15 Claims, 5 Drawing Sheets (56) References Cited

U.S. PATENT DOCUMENTS

| | | | | |
|---|---|---|---|---|
| 2003/0033347 | A1* | 2/2003 | Bolle | G06K 9/00711 718/107 |
| 2003/0090711 | A1* | 5/2003 | Yoshii | H04N 5/44504 358/1.15 |
| 2004/0044532 | A1* | 3/2004 | Karstens | G11B 27/102 704/271 |
| 2004/0093220 | A1* | 5/2004 | Kirby | G06F 40/20 704/278 |
| 2004/0125877 | A1* | 7/2004 | Chang | G06K 9/00335 375/240.28 |
| 2004/0234250 | A1* | 11/2004 | Cote | G11B 27/034 386/244 |
| 2005/0022252 | A1* | 1/2005 | Shen | G06K 9/00711 725/135 |
| 2005/0068571 | A1* | 3/2005 | Hart | H04N 1/00281 358/1.15 |
| 2005/0203750 | A1* | 9/2005 | Miyamoto | G10L 15/26 704/276 |
| 2007/0011012 | A1* | 1/2007 | Yurick | G10L 15/26 704/277 |
| 2008/0040111 | A1* | 2/2008 | Miyamoto | G10L 15/22 704/240 |
| 2008/0129865 | A1* | 6/2008 | Leonard | G11B 27/034 348/468 |
| 2008/0187286 | A1* | 8/2008 | Chung | H04N 5/85 386/254 |
| 2009/0278986 | A1* | 11/2009 | Ikegami | G11B 27/034 348/564 |
| 2010/0141834 | A1* | 6/2010 | Cuttner | H04N 9/8233 348/468 |
| 2011/0016195 | A1* | 1/2011 | Kaplan | H04L 65/602 709/219 |
| 2011/0320198 | A1* | 12/2011 | Threewits | G06F 40/166 704/235 |
| 2012/0098856 | A1* | 4/2012 | Thorpe | H04N 13/183 345/629 |
| 2013/0007619 | A1* | 1/2013 | Makino | G11B 27/105 715/716 |
| 2013/0120654 | A1* | 5/2013 | Kuspa | H04N 9/475 348/515 |
| 2013/0231050 | A1* | 9/2013 | Nakagawa | H04W 4/80 455/41.2 |
| 2014/0032973 | A1* | 1/2014 | Baker | G06F 11/3072 714/39 |
| 2014/0143218 | A1* | 5/2014 | Sanghavi | G06F 16/48 707/695 |
| 2014/0229970 | A1* | 8/2014 | Besehanic | H04H 60/43 725/20 |
| 2014/0304233 | A1* | 10/2014 | Belaunde | G06F 16/70 707/661 |
| 2015/0003797 | A1* | 1/2015 | Schmidt | G11B 27/031 386/201 |
| 2015/0019218 | A1* | 1/2015 | Yassa | G10L 15/05 704/236 |
| 2015/0208139 | A1* | 7/2015 | Homyack | H04N 21/4312 348/468 |
| 2016/0007054 | A1 | 1/2016 | Polumbus et al. | |
| 2016/0014482 | A1* | 1/2016 | Chen | G11B 27/031 386/241 |
| 2016/0066055 | A1* | 3/2016 | Nir | G10L 15/05 725/35 |
| 2016/0077719 | A1* | 3/2016 | Threewits | G06F 3/0481 715/714 |
| 2016/0133251 | A1* | 5/2016 | Kadirkamanathan | G10L 15/26 704/9 |
| 2016/0295132 | A1* | 10/2016 | Burgess | G11B 27/28 |
| 2017/0092274 | A1* | 3/2017 | Kaufmann | G06F 40/58 |
| 2017/0235729 | A1* | 8/2017 | Hughes | G06F 16/433 707/758 |
| 2018/0068662 | A1* | 3/2018 | Schlippe | G10L 15/187 |
| 2018/0136828 | A1* | 5/2018 | Threewits | G06F 3/04845 |
| 2019/0132372 | A1* | 5/2019 | Litsyn | H04N 21/2187 |

FOREIGN PATENT DOCUMENTS

| | | |
|---|---|---|
| WO | WO 02/089114 A1 | 11/2002 |
| WO | WO 2013/144605 A2 | 10/2013 |

* cited by examiner

CAPTION DELIVERY SYSTEM

TECHNICAL FIELD

This disclosure relates to delivering captions and other performance synchronised services in live theatre.

BACKGROUND

There has been a continuing requirement for captioning and subtitling services to display a text version of something which is spoken. Such captioning improves accessibility, allowing those suffering from hearing disabilities to follow a broadcast or performance by being able to read a transcript of a speech being delivered. Captioning is provided in a number of different contexts. In one context, films may be provided with captions which are synchronised to the verbal delivery of lines during the film. Such synchronisation is relatively easy to perform, because the script and timing are known in advance and synchronised captions can be prepared for delivery at the same time as the moving image of the file or its audio track. Captions have long been available as a service which can be accessed by people with a hearing disability. So-called 'closed captions' are viewed only when the service is selected by a viewer. More recently so-called smart glasses have become available by means of which captions can be delivered directly to smart glasses worn by members of a cinema audience. Subtitles are also known, for example for conveying a foreign language text of speech in the film.

In theatre, live performances represent particular challenges for captioning. At present, captioning services are triggered manually for certain accessible theatre performances. Predefined captions are created based on the script which is to be spoken. The captions capture dialogue for display to allow a deaf or hard of hearing person to follow the performance. The captions are manually triggered for display by a caption cuer whose task it is to follow the performance and to press a button to trigger the display of each caption synchronised with the oral delivery of the lines of the performance. In live theatre, the timing of captions needs to accommodate for variations in speech, timing, breaks and noises other than speech, which may be intentional in the performance or not. A person (caption cuer) can accommodate such variations by watching the performance and then providing the caption at the correct time.

Subtitles are also available in the case of live television broadcasts, again to assist the deaf or hard of hearing so that they may follow a broadcast even if they cannot fully hear the speaker delivering the broadcast. Text for the subtitles may be created by a human intermediary who follows the broadcast and dictates suitable summary language (including text and punctuation) to a speech recognition system provide a real-time transcript which can be displayed. Alternatively, machine shorthand can be used to generate the text. In such contexts, there are inevitably delays between the broadcast being delivered and the captions being displayed on a screen. Attempts have been made to play the broadcast soundtrack into a speech recognition system, the speech recognition system configured to provide a transcript of the speech.

The term speech recognition system is used herein to denote a system capable of picking up human speech and converting it into text to be displayed, the text corresponding to the speech which has been delivered. A speech recognition system might be used as part of a speech follower. Speech followers are used to synchronise an audio signal carrying speech to a corresponding script. This process may be performed by computer processing of a media file in order to time the script to the corresponding audio signal. The process may also be performed in real time to control the rate at which a script is displayed to a speaker, for example as a teleprompt. That is, a speaker is reading from a script in a live context, and a speech follower assists in making sure that the rate at which the script is displayed to the speaker matches the speaking rate of the speaker. These systems thus display part of a script corresponding to the location that they have detected the speaker has reached in the script.

Attempts have been made to provide a speech follower (using speech recognition) in the context of live theatre, to display a script in time with its delivery. The idea is to use a speech follower to follow the speech which is being spoken during the live performance, and to display the script at the correct time corresponding to the speech. However, it is very difficult to implement such speech followers in the context of live theatre, due to the many variables that can occur in live theatre. Previously, live speech follower systems have been used in studio contexts with good quality audio. They are not suited generally to live theatre, which poses a number of different challenges. Because of the theatre surroundings, rather than a studio context, there may be poor audio quality. The system has to cope with a number of different styles and speeds of speech and therefore cannot be trained to a standard style and speed of delivery. It is known that speech following systems behave more accurately when they can be trained to a standard style and speed of delivery. Theatres are subject to general background noise, which may be part of the performance itself, or may be unexpected. There may be long pauses between utterances on stage, while the action proceeds without dialogue. Utterances in theatres may consist not only of words but also other utterances such as exclamations or cries or whimpers, and may be unusually loud or quiet. Speech follower systems have previously generally been designed for a context where the speech (more or less) consists of words and is spoken at an even pace and at a reasonably even volume. Actors may have different accents, or deliberately be speaking in an affected way. The performance may consist of non-verbal information which nevertheless is part of the performance and which a person who is hard of hearing would like to know something about.

For all of these reasons, it has not been possible to date to successfully implement a speech following system to automatically cue captions for display in the generality of performances. So far, captioning services which have been provided, and which are increasingly in demand, have been manual.

SUMMARY

The aim of the present invention is to provide automatically an accurate delivery of captions to supplement a live performance in a synchronised manner, and which overcomes the above challenges. This aim is met by tracking the performance against a pre-defined script, which incorporates performance events as well as speaker dialogue.

According to one aspect of the invention there is provided a caption delivery system for displaying captions during a live performance, the system comprising:

a memory component storing a follower script and a caption script, the follower receipt including waypoints associated with performance cues;

a speech follower component operable to recognise spoken dialogue of the performance and to compare the spoken dialogue with the follower script to track the location in the follower script of the spoken dialogue to identify when a caption is to be displayed;

a caption output module configured to access from the caption script the caption for display at each location in the follower script associated with a caption;

a cue handler component which stores performance cue identifiers with associated cue metadata and which is configured to receive performance cues detected in the live performance and output cue signals to the speech follower component to thereby assist the speech follower component to determine the location based on the waypoints at the detected cues.

In addition to cues identified in the follower script, it can comprise non-cue metadata corresponding to events in the live performance and usable to assist in tracking the location of the live performance relative to the follower script.

An aspect of the invention provides a system and method for improving the reliability of a speech follower by using 'soft' metadata and/or cues representing fixed waypoints. One category of cue metadata causes a control signal to be generated to a speech detection module to cause it to turn off when speech is not expected at that time in the performance, and to turn it on again when speech is expected. This prevents the speech follower from attempting to follow speech when it is known from the performance timeline that a pause or other non-dialogue effect is expected.

Another category of cue metadata causes a control signal to be provided to the caption output module to trigger the display of a non-dialogue caption from the caption script which is associated with that cue. For example, text could describe a sound effect generated by the cue such as "DOG BARKING" or "GUN SHOT". The caption delivery system may comprise a caption distribution module configured to receive captions from the caption output module and to generate caption messages for display.

When configured to deliver captions for multiple live performances the memory component stores a first follower script for a first performance and an associated first caption script for the first performance, and a second follower script for a second performance and an associated second caption script for the second performance, wherein the caption distribution module generates caption messages for the first and second performances which are occurring at the same time, each in a respective channel with a performance identifier associated with the caption messages for that performance. The memory component may be a single computer memory or distributed memory. The caption distribution module may be configured to generate the caption output messages in a format which defines colour and style of font for display. The caption distribution module may be configured to generate caption messages in which the text of a caption for display is defined in plain text form. The caption distribution module may be configured to create caption messages which define at least one of a background colour and foreground colour for display of the text.

In one augmented version, the memory component stores a translation script which stores for each entry in the follower script a caption in a language other than the language in which the performance is being delivered.

In another augmented version, the memory component stores an audio script which identifies at each of a plurality of timepoints in the follower script an audio recording to be played at those points. Note that these audio descriptions do not track the dialogue but are triggered to describe scenes for a blind person (who can hear the dialogue). The caption delivery system may comprise a plurality of display devices each equipped with a receiver for receiving caption messages with captions for display, and a display for showing the captions to a user of the receiving device. The receiving devices can be glasses, e.g. so-called 'smart glasses'. The caption delivery system can comprise a caption editing module arranged to receive a production script and a timeline for spoken delivery of the script, and to generate from the production script and the timeline of the spoken delivery of the script, the follower script and the caption script. The caption editing module may be configured to receive manual input during a rehearsal of a live performance to modify production of the follower script and caption script.

A further aspect of the invention provides a method of delivering an information output to a viewer of a live performance, the information output being at least one of displayed text and an audio description at predefined times in the live performance relative to stage events by providing follower script with entries organised along a timeline, and metadata at timepoints between at least some of the entries, wherein the metadata is associated with stage events in the live performance, and using speech recognition to track spoken dialogue against the entries in the follower script, and the stage events to aid in following by synchronising with the metadata.

According to another aspect of the invention, there is provided a caption delivery system for displaying captions during a live performance, the system comprising:

a memory component storing a follower script and a caption script, the follower script including waypoints associated with event-related metadata.

a speech follower component operable to recognise spoken dialogue of the performance and to compare the spoken dialogue with the follower script to track the location in the follower script of the spoken dialogue to identify when a caption is to be displayed;

a caption output module configured to access from the caption script the caption for display at each location in the follower script associated with a caption;

wherein, the speech follower component is configured to detect events in the performance and to use the associated waypoints to assist the speech follower component to determine its location in the follower script.

According to another aspect of the invention, there is provided a caption delivery system for displaying captions during a live performance, the system comprising:

a memory component storing a follower script and a caption script, the follower script including waypoints associated with performance-related metadata (e.g. associated with cues or other events).

a speech follower component operable to recognise spoken dialogue of the performance and to compare the spoken dialogue with the follower script to track the location in the follower script of the spoken dialogue to identify when a caption is to be displayed;

a caption output module configured to access from the caption script the caption for display at each location in the follower script associated with a caption;

wherein, the speech follower component is configured to detect events in the live performance and to assist the speech follower component to determine its location on the waypoints at the detected events.

For a better understanding of the present invention and to show how the same may be carried into effect, reference will now be made by way of example to the accompanying drawings in which.

Figure 1:
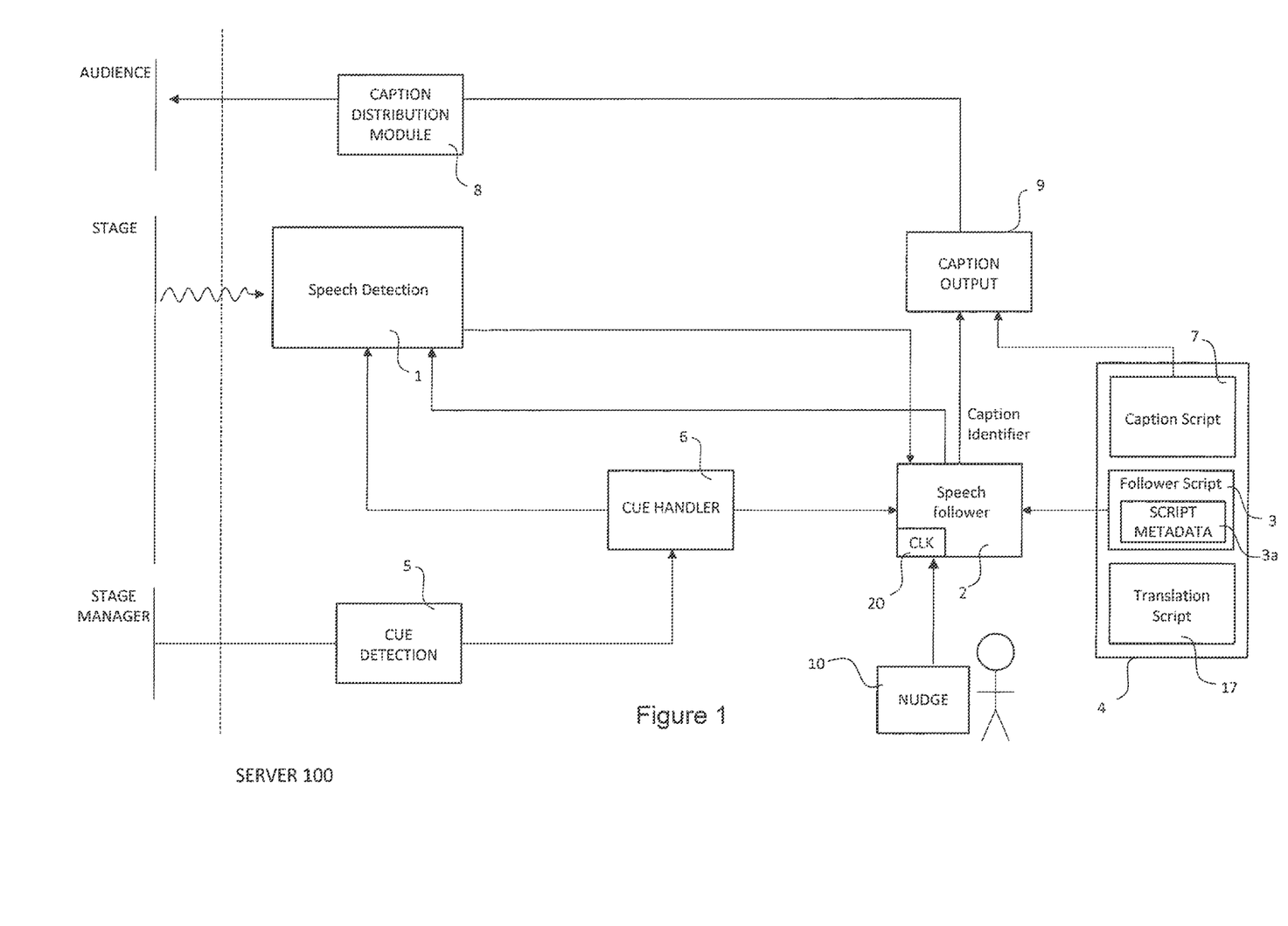
FIG. 1 is a schematic block diagram showing server side functionality of a caption delivery system operating in a performance.

FIG. 1 is a schematic block diagram of a system for delivering captions in the context of live theatre. A stage play can be considered to comprise a sequence of stage events. A stage event may be an utterance by an actor, a change in lighting, a triggered sound effect or a movement of scenery, for example. The stage events comprising a play are expected to, and normally do, occur in a prearranged sequence. However, in contrast to films, this prearranged sequence may not always have the same timeline. The length of each event might vary from performance to performance, and the time between events might vary, and occasionally the order of events might vary. This is a factor of a live performance. Access services for a stage play can be provided by delivering captions to assist people who are deaf or hard of hearing. In the system described herein, these captions are presented as a sequence of caption events. For example, a given caption event will correspond either to an utterance in the sequence of utterance events, or another stage event such as an effect event, for example the playing of particular music. As explained in the background portion above, currently a human captioner will follow the performance by listening to the utterance events and effects events, matching them against a caption script and pressing a button at the correct instance to deliver for each caption for display. The reason a human captioner has been used to date is due to the need for human skill to deal with factors such as:

- variability in the duration of and intervals between utterances and stage events,
- content of utterances varying depending on the lead actor for that performance,
- the need to discriminate between utterances and other sounds for example audience noise or sound effects or exclamations; and
- the need to follow different modes and volumes of speech uttered in different ways The challenge which the system described herein seeks to meet is how to automatically trigger each caption event at the time at which its corresponding stage event occurs. As described more fully in the following, data gathered from the script itself and during rehearsals aids an automated system and enables it to be loaded with the sequence of expected utterances and a sequence of expected stage cues. The stage cues give it fixed waypoints whereby its assumption about current location derived from audio input can be updated. Metadata is added to enable other useful information to be classified and parameterised in order to assist an automated follower to stay 'on track'. This is described in the following.

So-called 'tech' stage cues are commonly used in live performances. They are managed by a stage manager whose task it is to follow the performance against a performance script and to trigger cues to be issued at the appropriate points in the performance. Cues are triggered by activating an interface (e.g. pressing a button) which causes an electronic control signal to be generated which triggers the desired action at the cue, e.g. light control, audio effects, stage prop movement etc. Stage cues are often delivered according to a standard referred to as OSC. In the present system these cues are used to aid following of the script to deliver captions.

FIG. 1 shows the caption delivery system in use during a live performance. As will be explained in more detail in the following, there are a number of different steps prior to the point at which the system is fully operative to deliver captions in a live performance. Thus, FIG. 1 shows components uploaded to a server 100 ready to deliver captions to a live performance. These components may be implemented in hardware or software or any combination. Active modules may be implemented by a suitably programmed computer. In most cases software is uploaded to a server with modules pre-programmed to use the software. The dotted line in FIG. 1 represents a differentiation between components on the server side and the live theatre portions. This is entirely diagrammatic and is just to illustrate use of the system. When the system is in use, captions may be delivered to a screen visible to members of the theatre audience, to individual devices such as tablets or smart phones, or, more preferably, 'smart glasses' used by members of the audience as required. The system comprises a speech detection component 1 which detects speech delivered by the actors on stage and converts it into a form which can be used by a speech follower 2 to compare the position of the speech with a predefined script that the actors are delivering. This is referred to herein as a follower script 3 and is shown stored in a memory component 4. This form could be phonemes, text or any other suitable form which enables a speech follower to track the speech against the predefined script. Speech followers are known per se in the field of teleprompting to enable a predefined script to be delivered at a rate matching an input speech, so that the speaker can follow it. Speech following is augmented in the present system by using the stage cues, and/or 'soft' metadata in the follower script.

In the caption delivery system described herein, the memory component 4 holds at least two different scripts 3, 7. Note that these scripts are shown separately in FIG. 1, but could be implemented as a single document framework as discussed later. The first script, the follower script 3, is for the purpose of assisting the speech follower to track the most likely point in the performance that the current speaker has reached. That is, the output of the speech detection component 1 (be it text or phonemes et cetera) is compared with text (or phonemes etc.) in the follower script 3 at and around the currently determined position in order to continue to update the location of the currently determined position. The speech follower maintains a clock 20 which can be adjusted in line with the determined position to indicate location in the expected timeline of the production. The determined position is used to control the triggering of captions representing the dialogue. To achieve this the second script which is held in the memory component 4 is a caption script 7. This is a script of the lines of text which are to be displayed as captions corresponding to the location which has been determined by the speech follower. The text in the follower script is related to equivalent text in the caption script during the preparation of the scripts. Each line in the follower script has a corresponding line in the caption script. The caption script also includes unspoken dialogue, for example speaker labels, song lyrics, descriptions of audio effects. As the line position determined in the follower script is updated by the speech follower the particular corresponding caption from the caption script is sent to a caption distribution module 8 under the control of a caption output module 9. The follower script 3 incorporates additional metadata 3a about the performance which improves speech following and thus the accuracy of caption delivery. Metadata in the follower script can be used to aid following of the performance to give the speech follower the best possible chance of following a spoken performance in a live theatre environment. This metadata will be described in more detail later. So-called 'hard' metadata may be associated with cues which are expected to be delivered during the live performance, so-called 'soft' metadata may be associated with particular (non-cued) events. Cues delivered during the live performance are detected by a cue detection component 5. The cue detection component supplies detected cues to a cue handler 6. Operation of the cue handler will be described later. The detection of cues and use of metadata allows the speech follower 2 to be periodically synchronised with the timeline of the live performance, as explained later. Note that while the metadata 3a is shown in the follower script 3, it could be stored in any suitable place accessible to the follower 2. By using metadata associated with the timeline in the follower script, speech following can be much improved. However, it may occasionally be necessary to 'reset' the precise location. For this a nudge component 10 can be provided to advance or retard the clock 20 to more closely track the timeline of a production based on input from a human operator watching the performance. The nudge component 10 has push-button inputs which feed specially designated cues to the cue handler 6, eg: "advance 1 second", "back 2 seconds".

Figure 2:
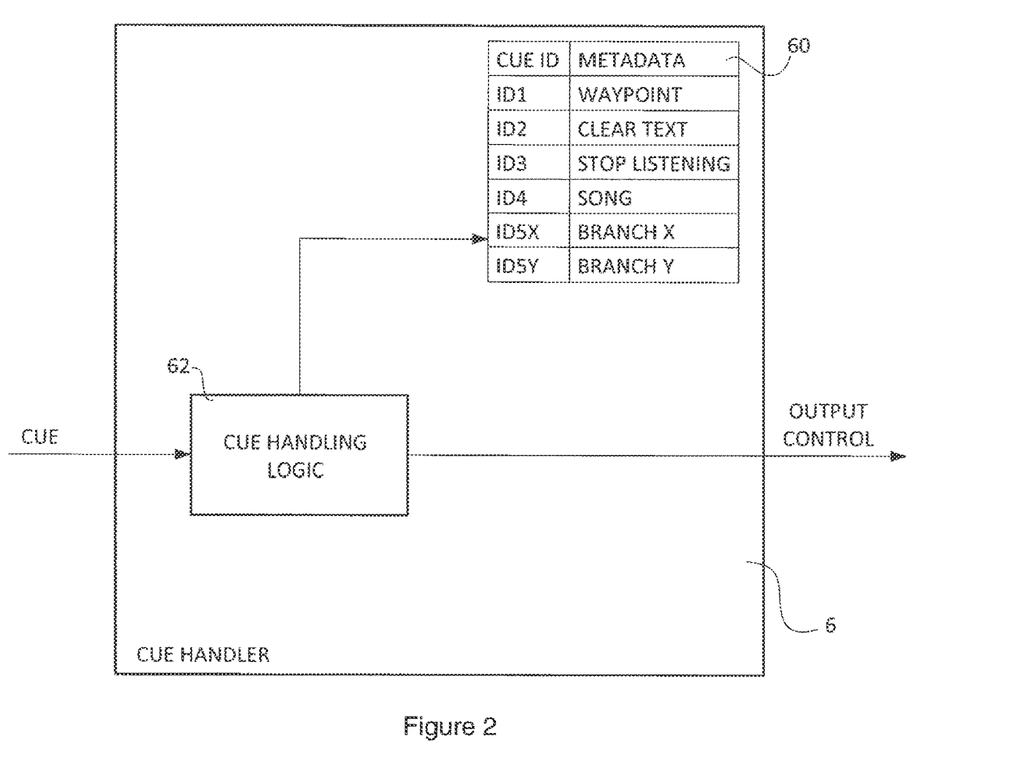
FIG. 2 is a schematic diagram of a cue handler.
Figure 3:
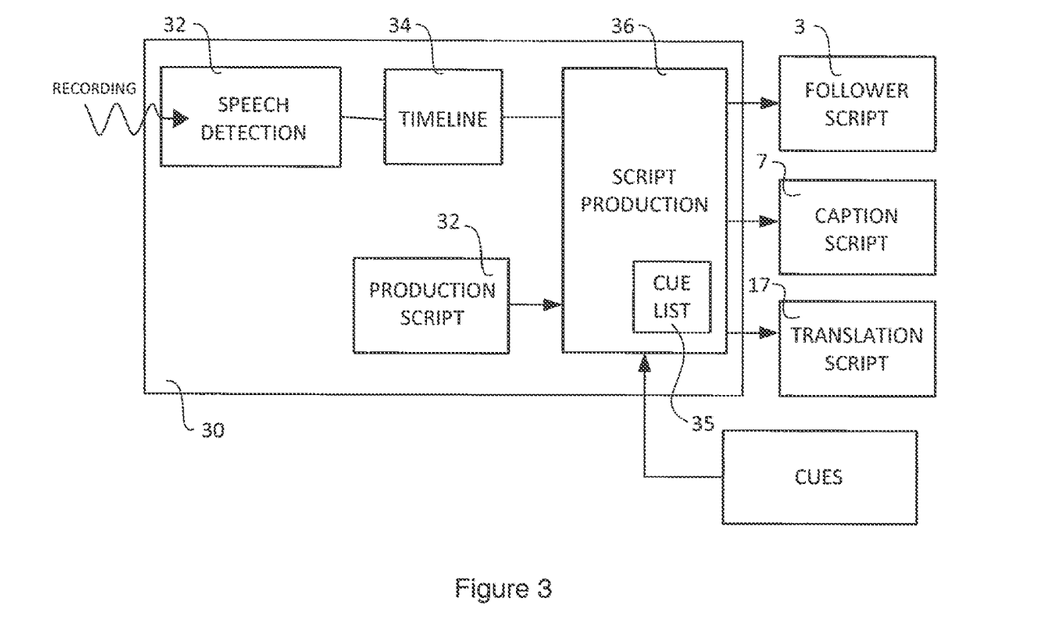
FIG. 3 is a schematic block diagram of a caption editing system for generating scripts.

Operation of the cue handler will now be described with reference to FIG. 2. The cue handler 6 comprises a store 60 in which each cue received from theatre systems such as sound and lighting control systems is matched against a predefined list to retrieve metadata which controls how cue-related captions are displayed. Each cue has a cue identifier which is labelled Cue ID in the store 60 and a number of examples are shown by way of example only and not by limitation. Cue identifiers could be numbers, letters or any appropriate digital identification string. For ease of reference they are labelled ID 1, ID 2, ID 3 et cetera. Each cue is associated with metadata. The metadata can define a number of different cue responses and examples are shown in FIG. 3. For example, Cue ID 1 could be associated with a particular waypoint in the following script, but have no effect on caption display (e.g. close curtains). Cue ID 2 could be associated with an instruction to clear all text from the caption display. Cue ID 3 could be associated with a control signal which interrupts the listening function of the speech detection component 1, for example when the performance time line reaches a pause or song etc. Cue ID 4 could denote the beginning of a certain predefined display insert, such as lyrics of a song. These examples of metadata are non-limiting, because any particular performance will be associated with its own unique set of cues and each cue could have metadata relevant to that performance. It would be understood however that it is likely that many of the cues will be associated with waypoints in the follower script timeline which can be linked to specific captions. The cue handler 6 has cue handling logic 62 which detects an incoming cue, identifies it and accesses the store 60 to retrieve the metadata for that cue. A control signal (or cue signal) is output to the speech follower 2 to aid following by comparing the cue with the determined position in the follower script, and adjusting the position to bring them into line if necessary. Depending on the metadata a control signal may be sent, to the speech detection component 1 to control 'listening' (start/stop).

A first category of cues can affect operation of the speech detection component 1, for example to cause it to 'stop listening' for a defined period at points in the play when the cue has indicated that no reasonable dialogue is likely to be picked up due to the point that has been reached in the performance. For example, it may be known that at that point the actors are not speaking (there is a predefined pause), there are audio effects, or there is another interlude such as a song. This avoids background noise interfering with speech follower.

A second category of cues can guide operation of the speech follower 2. For example, if the cue denotes a certain waypoint, this can be matched with the position that the speech follower has determined the dialogue is at in the follower script, and if the same way point is not aligned in time, the speech follower can adjust the clock 20 to bring the determined position gracefully into line and so to improve following of the follower script subsequently. Such cues can also cause captions to be displayed.

A third category of cue addresses the problems that can arise when different actors may read the same dialogue (in different performances). These cues have metadata identified in the store as 'branch'. This is shown in FIG. 2 as Cue ID 5. In fact, a script may include two different cues, each associated with a different branch (ID5X/ID5Y). If actor X is delivering the lines, cue 5AX can be triggered. The metadata associated with that cue can cause a speech follower to branch to a certain portion of the follower script and output a sequence of utterances at that branch location associated with actor X. However, if actor Y is speaking the dialogue, the cue 5Y can be triggered and the follower script moves to a different branch location in the script which defines and output a different sequence of utterances (either to reflect a different accent or altered dialogue or both). One reason for this is that different actors performing the same play can nevertheless use different variations of the script at the same point in the dialogue. Such branching is referred to herein as branching from railway points, and allows the speech follower 2 to take a different route for lead actor X as compared with lead actor Y, and then come back to a common thread in the follower script after the particular sequence which pertains to those actors has been delivered. Note that such railway points may be provided both in the follower script 3 and also in the caption script 7. In the follower script they can be used to assess what point in time the play has reached. In the caption script 7, they are used to control which set of captions is displayed at that point.

A fourth category of cue controls the display without displaying dialogue. For example, there may be an instruction to clear all text, and this instruction will cause captions to be cleared off the display screen. It may be that there is a particular song which is going to be played at that point in time, and the caption output module 9 can access the lyrics of the song and display those, at a predetermined rate while the song is being played in live performance. The predetermined rate can be set during rehearsal as described later.

Note that the follower script 3 includes metadata 3a which enables the determined location of the speech follower in the follower script to be frequently checked against the timeline of the live performance. The caption output module 9 is capable of outputting captions in the caption script matching the follower script as followed by the speech follower 2. As already mentioned, this might be the exact dialogue which is spoken formatted for display or some slightly modified version of it. In particular it is important to understand that displayed captions could be spoken dialogue or other items based on the cue metadata. This could be such actions as displaying the lyrics of the song or text descriptions of audio effects. Each new determined line in the caption script will be displayed; metadata may then cause the text to be cleared after x seconds. Other lines may be replayed simply to time (song) and not determined explicitly by the speech follower.

Figure 4:
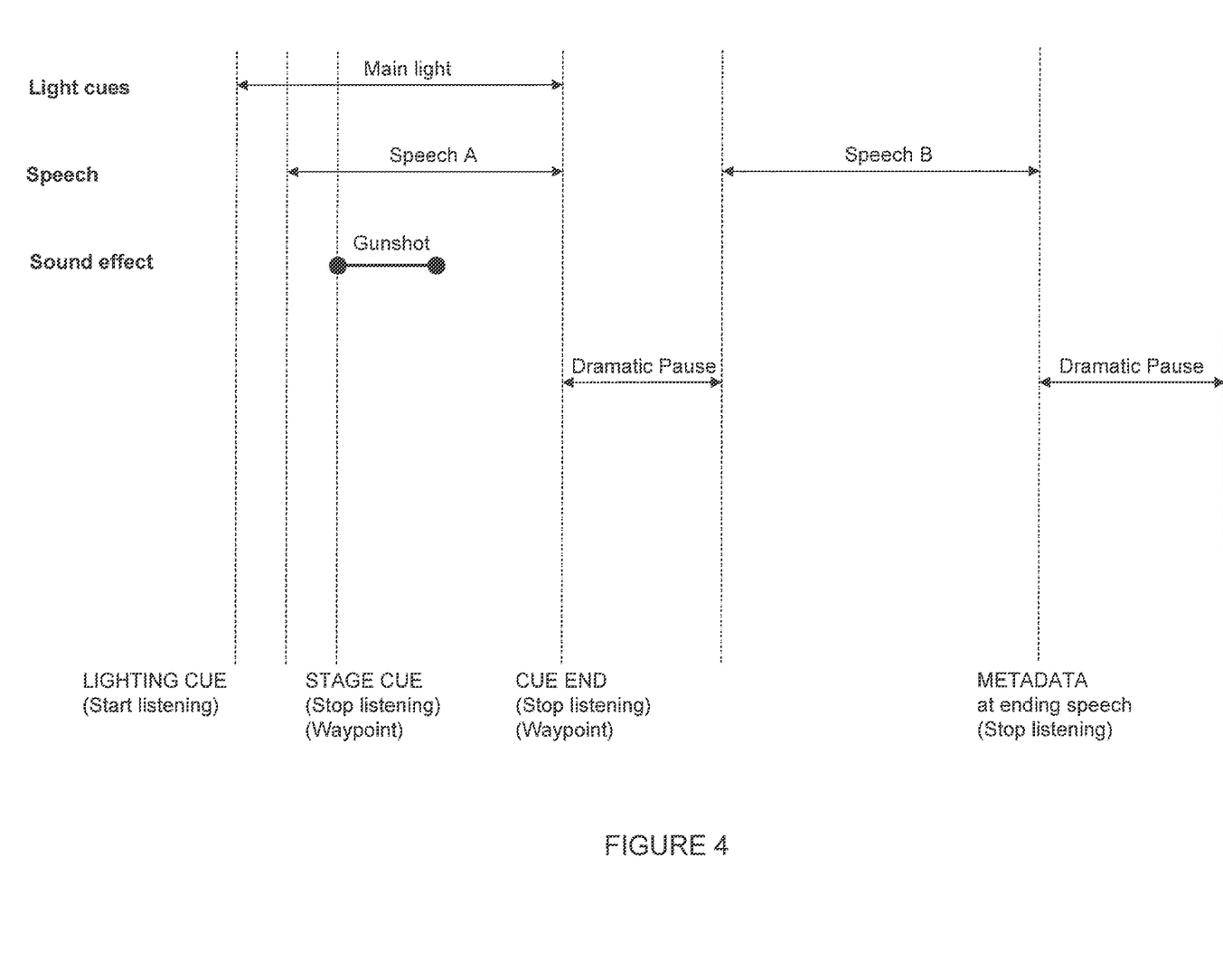
FIG. 4 shows an example time line.

Generation of the scripts will now be described with reference to FIG. 3 which illustrates a caption editing system 30. The caption editing system receives a production script 32. The script includes speaker labels denoting who is speaking at what time, and information about special effects which will be generated at certain times, and other key events in the performance. Such scripts are available for live performances. The production script completely describes all events in the performance as well as the spoken dialogue. An extract of the dialogue only forms the follower script 3. This may be accessed as a subset of the caption script or created as a separate parallel script. This is the information against which the speech follower follows. It may be edited to phoneticise to make easier to follow, and the vocabulary of the script will be used as the vocabulary of the speech recognition component in the speech follower. The caption script is also derived from the production script and includes text to be displayed, speaker labels, events description etc. A timeline 34 for the performance is created. The caption editing system includes a speech detection module 32 which can capture a recording of the spoken dialogue of the script to allow the timeline of the performance to be obtained. Further metadata is added to the follower script to indicate the timeline of the final rehearsals. Time points are stored with each caption in the caption script to match the timeline of the performance. During this phase, the caption edit system 30 also receives and stores cues. It pre-filters, the cue data to extract 'action' cues rather than 'prep' cues or status info. A cue list 37 is built, each associated with its time point in the timeline. By this means a human editor can then be shown a display use the editing system to select cues which represent useful waypoints, cues which may precede silences, cues which signify the start of a song etc. If there may be a branch, the stage management team can be asked to insert a branch cue (ID5X or ID5Y) and cause it to be triggered at that point in the dialogue. Finally, if no explicit cue is available from stage management, the captioner may insert a self-cue ('soft' metadata) into the script to denote/define a pause of more than a few seconds, or some other stage event which requires control of the speech follower or caption delivery. FIG. 4 shows an example of some of the events which may be captured in a timeline for a performance. The top line denotes lighting cues, and the second line includes speech delivered by live actors (speech A/speech B). Lighting cues are shown as examples of cue points which might be associated with waypoints in the following script. These are just some examples of cues which may be captured—there may be many different kinds of cues. A stage cue, such as a gunshot, is also shown. Key moments may be included in the timeline, such as dramatic pauses. Note that the first dramatic pause may be associated with a 'hard' cue/waypoint, while the second dramatic pause is associated with 'soft' metadata at the end of speech B. Other events could be scene end/interval. Just by way of example, these may be associated with cues which would cause text to be cleared from the display and/or an interval to be announced. The 'soft' non-cue metadata 3a can be provided in the follower script. This metadata is not associated with a cue. For example to tell the system that once caption 27 has been displayed it can stop listening for a time period, e.g. 10 seconds.

The production script and the timeline (associated with the utterances and events) are supplied to a script production component 36 of the caption editing system 36 which carries out the above steps. The speech production component 36 outputs the follower script 3 and the caption script 7 (and optionally a translation script to be described later). Script production might also involve some manual input, as described above. What is important here is that the follower script entries and the caption script correspond so that when the speech follower determines a location in the follower script the corresponding caption is displayed. Each entry in the follower script has a corresponding entry in the caption script. Where there are two separate scripts this can be done by line number, but it could also be done by a single electronic document with caption entries marked up, for example. When the speech follower component 2 (FIG. 1) is following the live performance and detects new line in the script, the caption associated with that line is displayed. Note that the cues and the metadata are defined at this stage, and inserted into the follower script and the caption script. At this point, the cue metadata store 60 is established to associate appropriate metadata code with each cue. Before the script generated by the script production component 36 and the cue metadata can be uploaded into the server for live performance, there is a rehearsal stage. In the rehearsal stage, the speech follower component 2 is active, and an assessment can be made as to how well the speech following component is following a recording of the rehearsal. This allows modifications to be made, for example to put into the speech follower script what the speech recogniser thought the actor was saying (maybe rather than what the dialogue would have indicated). This allows a speech recogniser to have guide utterances which might be more appropriate to enable a speech follower to track the script. The final production component (the script and the cue metadata) are uploaded into the server ready for the performance. The caption delivery system can be augmented to provide captions in alternative languages to the script which is being delivered on stage. A translation script 7 provides a foreign language version of the script. The foreign language captions are pre-stored in the translation script 7, corresponding by line number (or make up) to the follower script 3.

Another augmentation is to provide an audio script (not shown). This could issue or trigger audio description, for example based on a pre-recorded sound file. For example, it could point to different sound files in a memory which could be supplied on request to earpieces for blind or partially sighted people to allow the activity on stage to be described. It will be appreciated that such audio files are likely to be generated at points where there is no dialogue, the assumption being made that the blind or partially sighted people are able to hear the speech, but are not able to follow the play because they cannot see what is happening in between the speech. The audio files may be triggered by trigger times from the clock which tracks the production timeline.

Figure 5:
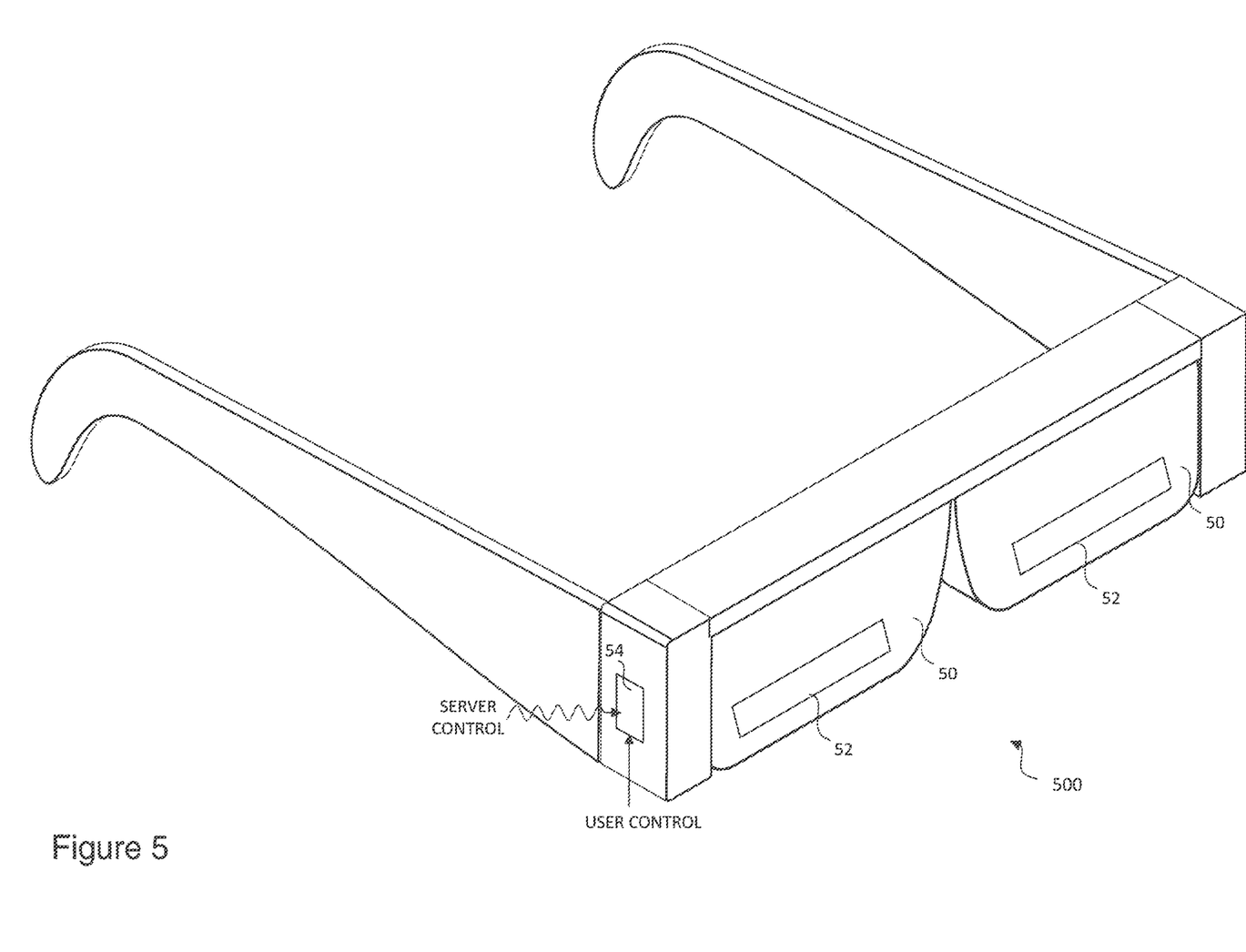
FIG. 5 is a schematic block diagram of glasses for delivering captions.
Figure 6:
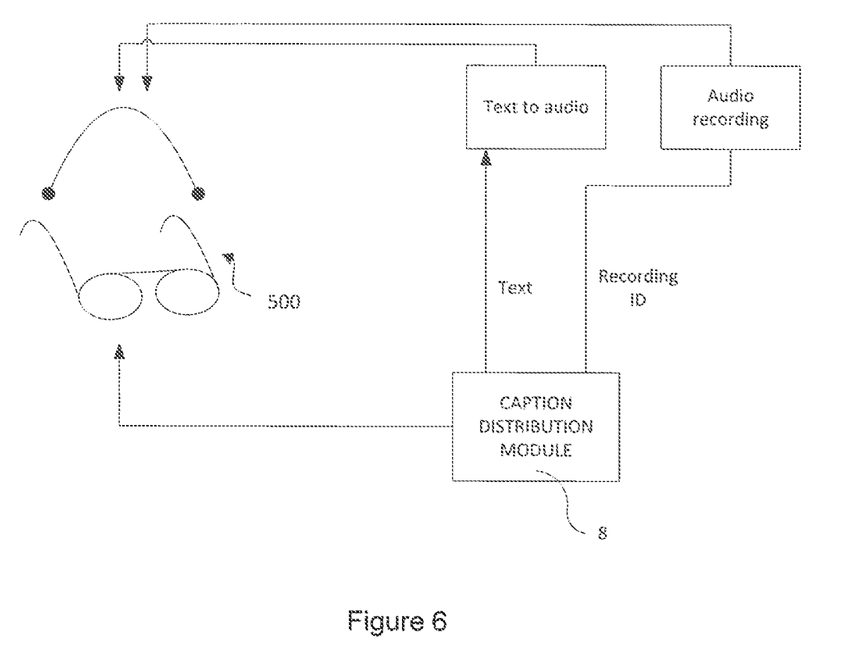
FIG. 6 is a schematic block diagram showing delivery of audio information.

As mentioned, one preferred display system is so-called 'smart glasses' or 'smart eyewear. Such glasses are known and so will not be described in depth here. In brief, smart glasses can be worn by a user in the manner of normal glasses, and have a display and have a lens in front of each eye of a user, the lens being transparent to allow a user to view what is beyond the lens, but also including a display portion which can display items to the viewer. Such glasses are used for example in augmented reality. FIG. 5 shows a pair of glasses, with the lens designated by reference numeral 50 and the display area in each lens designated by reference 52. The glasses include a controller 54. This controller is connected to the display to control what is displayed there, and can receive as input user control inputs and server control inputs. The server control inputs come from the server side (from the caption distribution module 8), while the user control inputs can come from a user wearing the glasses to give them some control over how items are displayed to them. The glasses should preferably fulfil the following physical requirements. They are designed to be as lightweight as possible, preferably below 100 g. They are suitable for people who already wear glasses, as well as those who do not. They may be provided with an adjustable frame. Ideally, they have a minimal frame around the lenses (to maximise the display area). Preferably they look discreet when in use. It is important in a theatre context that there is a low light output to nearby people such that the performance is not interrupted by local light. A reasonable battery life is needed (for example, a minimum of 4 hours as appropriate). They should be quick to issue, adjust to fit and have an easy user control system to provide the user control inputs. For example, the user control input could select a language for display. Preferably they could be provided with a rechargeable battery with multiple headset does/charging station. They could additionally be provided with headphones/built-in speakers for delivery of the audio translation.

The technical requirements for the glasses are ideally adjustable to locate the text at the same apparent depth as the actors on the live stage. Ideally the text display has a high resolution, and it is advantageous if multiple lines of text may be displayed at one time. It is possible to provide an option for scrolling text and/or an option to pop-on pop-off block display. A user control input could remotely switch between these options. The display brightness could be adjusted (either remotely from the server side or by the user), and similarly text size and text colour could be adjusted remotely and/or by the user. According to one option, there is the ability to select up to 10 display channels (for example, for different language translations). Contact with the server side could be wireless, for example Wi-Fi or Bluetooth (although it is expected that Wi-Fi is advantageous due to the larger range).

Communication between the server side system, in particular the caption distribution module 8 and the server control interface on the controller 54 of the glasses may be implemented as a TCP (Transport Control Protocol) connection which would normally remain open for the duration of the performance. However, given that each message is independent closing and opening a connection would not affect the output. The glasses display captions in real time as each individual message is received. The caption description is compatible with the EBU-TT part 3, defined in https://tech.EBU.ch/docs/text/tech3370.pdf et al. Each combination of language and show is a distinct stream with its own stream identifier. The stream identifier is configured to be sufficient to route the message to the appropriate output devices. It is possible to have a separate connection from the caption output module 9 to the caption distribution module for each show/language if that is more convenient. When utilised with the above system, there is no need for the presentation system at the glasses to manage any timing, for example the duration of display of the caption. As described above, the caption output module in association with the speech follower can explicitly issue a 'clear instruction' or appropriate "scroll rate" parameter is sent so that the glasses know how fast to scroll the text. Each message therefore defines precisely what should be displayed at the moment after it is processed, and then after that the display will be updated by further messages.

There follows some caption examples.

Example 1 denotes a message which causes the text 'ladies and gentlemen: please switch off mobile phones' to be displayed in bold font in white text on a black background. A style identifier in the message indicates the background and foreground colours, and the font style (font weight). The span style parameter in the body of the message defines the text.

According to Example 2, the span style parameter in the body of the text provides the phrase "dogs barking" as a caption. This will follow an identified cue which has been detected by the cue handler and which is associated with the metadata to display this text. In the performance itself, there will be an actual sound of dogs barking at this point in the timeline.

Example 3 is an example of a message which is conveying actual dialogue in the play: 9 "I am a dealer not a doctor!". Example 4 also follows dialogue from the play but shows 2 different pieces of dialogue on the same display, the second piece aligned to the right: "are you my friend?"/"I don't think so!"

Example 5—shows an empty message.

Example 1

```
<tt xmlns:ebuttp="urn:ebu:tt:parameters"
xmlns="http://www.w3.org/ns/ttml"
xml:lang="en" ebuttp:sequenceIdentifier="cleansed_English_Theatre1"
ebuttp:sequenceNumber="100001">
<head>
<styling>
<style xml:id="s1" tts:backgroundColor="black" tts:color="white"
tts:fontWeight="bold"
/>
</styling>
</head>
<body>
<div>
<p>
<span style="s1"> Ladies and gentlemen:<br/>
Please switch off mobile phones. </span>
</p>
</div>
</body>
</tt>
```

Example 2

```
<tt xmlns:ebuttp="urn:ebu:tt:parameters"
xmlns="http://www.w3.org/ns/ttml"
xml:lang="en" ebuttp:sequenceIdentifier="cleansed_English_Theatre1"
ebuttp:sequenceNumber="100002">
<head>
<styling>
<style xml:id="s2" tts:backgroundColor="black" tts:color="white"
tts:fontStyle="italic" />
</styling>
</head>
<body>
<div>
<p>
<span style="s2">DOGS BARKING</span>
</p>
</div>
</body>
</tt>
```

Example 3

```
<tt xmlns:ebuttp="urn:ebu:tt:parameters"
xmlns="http://www.w3.org/ns/ttml"
xml:lang="en" ebuttp:sequenceIdentifier="cleansed_English_Theatre1"
ebuttp:sequenceNumber="100003">
<head>
<styling>
<style xml:id="s3" tts:backgroundColor="black" tts:color="white" />
</styling>
</head>
<body>
<div>
<p>
<span style="s3">I'm a dealer not a doctor!</span>
</p>
</div>
</body>
</tt>
```

Example 4

```
<tt xmlns:ebuttp="urn:ebu:tt:parameters"
xmlns="http://www.w3.org/ns/ttml" xml:lang="en"
ebuttp:sequence1dentifier="cleansed_English_Theatre 1"
ebuttp:sequenceNumber="100004">
<head>
<styling>
<style xml:id="s3" tts:backgroundColor="black" tts:color="white" />
<style xml:id="s4" tts:backgroundColor="black" tts:color="white"
textAlign="right" />
</styling>
</head>
<body>
<div>
<p>
<span style="s3">Are you my friend?</span>
<br/>
<span style="s4">1 don't think so!</span>
</p>
</div>
</body>
</tt>
```

Example 5

```
tt xmlns:ebuttp="urn:ebu:tt:parameters"
xmlns="http://www.w3.org/ns/ttml" xml:lang="en"
ebuttp:sequenceIdentifier="cleansed_English_ Theatre 1"
ebuttp:sequenceNumber="100005">
<head>
</head>
<body/>
</tt>
```

The EBU-TT specification is useful in this context because the format permits 'decoration' with many parameters, and is a tried and tested standard way to convey live text. It permits display of multiple languages and with a potentially extensible range of mark-up to code style, as well as enabling a stream context and font accepted to be specified.

The controller 54 provides a receiver for receiving the messages. A socket is opened on the server side (caption distribution module) with a socket ID for each language for each production show. For example, if a particular play is being captioned in three languages, three distinct channels will be opened. If simultaneously another production is being run at a different theatre in eight languages, an additional eight distinct socket connections are opened. In opening a connection, the production ID and the language are specified. Caption messages are pushed to that connection as required until the end of performance. A commencement message may be provided, for example 'ready to roll' to the controller 54 to enable the controller to provide instructions to a wearer as to how to set up the system if needed. Alternatively, such a message can just trigger the controller 54 to be ready for incoming caption messages.

In a context where there may be restricted bandwidth and to avoid channel delay, broadcast/multicast methods may be utilised to send each caption update message once over an Internet connection to all headsets, which could then select only the ones that they are interested in based on their configuration by production ID and language. That is, all channels could be broadcast at all time, but individual glasses could be tuned in to receive particular ones at particular times.

By using the user control, users may adjust text size and/or font. However, there may be advantages to disallow the users from doing this, since in the past theatre captioners have wished for editorial reasons to be an explicit control of line breaks, for example. As shown in example 4, the protocol allows for explicit control of line breaks. Nevertheless, there may be circumstances where a local option could be settled to ignore this and so cause any subsequent text to append to that already on display. A possible disadvantage is that the text on the display will be scrolling up and therefore that a user selected option may cause incoming text to be appended to a half displayed line. In one example, therefore, it is possible to define a fixed adequate text size in the glasses from which it can be derived how many characters will fit on a row.

The controller on the glasses is configured to receive all messages and control signals from the single distribution port, and to filter them to different glasses depending on the show that the user is watching at the time. In another example, the server offers a single port but permits multiple connections. Such an arrangement also allows for an alternate sender to take over if a particular caption distribution module fails. Moreover, it also allows for an emergency message such as 'please leave the building by the nearest emergency exit' to be sent to all glasses in all languages from a central safety system independently of the captioning system.

In a caption delivery system described herein use is made of two features in particular. There are predetermined waypoints which are the points at which cues can be guaranteed to occur and they can be guaranteed to occur in a fixed relationship to fixed items of dialogue because they are effectively following cue triggers. What actually is happening in the theatre is someone is manually triggering calling up stage cues, lighting cues and so forth. Use is made of the pre-existing human following of the play, by a stage manager whose job it is to cause staff to prepare for cue 153, trigger cue 153 etc. At that point someone presses a button, a cue signal goes out, the light comes on, or the music starts to play, and the system captures that signal to know where it is quite precisely in the timeline.

Some of the cues may not be useful so part of the preparation of the metadata is to pre-determine which cues are useful, where they occur in the follower script and what their nature is, whether they signal (because the person doing this would have watched the rehearsals) it is going to be music or a song or a sound effect or silence or whatever they may be. The cues associated with metadata act as hard waypoints, something that can be relied on pretty definitely. What the follower then needs to do is to travel between those waypoints as accurately as possible using the speech following technology. Preferably there may be a cue every 3 or 4 minutes, and the dialogue is followed in between that not just using the speech follower alone but also using a knowledge of the timeline of the performance by previously having captured that as additional metadata associated with each entry in the follower script. So the captions will have times associated with them that indicate that, during the rehearsal at least, this was the broadly speaking expected rate of delivery. The speech follower then takes into account the data from the audio, (as it matches it against the following script), plus the metadata which defines the broadly expected timeline plus 'hard' signals from the cues which tally with what was supposed to be at a particular waypoint. When it is all taken into account, it regulates the determined position so as to proceed as accurately as possible but also as smoothly as possible through the stepping out of the captions for display. In other words, for example, if it was drifting a little bit (e.g. 2, 3 or 4 seconds late), and a 'hard' cue is received, it does not skip the captions that would have been expected to be delivered between where it is currently and where the cues tell it it should be so the system advances the rate of delivery so as to catch up and then continues following. The system enables following in the context of sparse information from the speech follower, because it is working in an environment, with audible noise and other sounds which throw the speech follower off track and also periods of silence. The system uses that sparse information to determine position in the script and double checks that position by the availability of the 'hard' waypoints which are the things signalled by the cues.

The caption script can be considered the primary script. It is divided into entries lines which correspond to the captions that are going to be displayed, so each line corresponds to a new caption scrolling out of the bottom of the LED display. For example, these may be 100,000 or 200,000 lines of dialogue in an entire production.

The caption script has speaker labels which are displayed with the lines. The first step to create the follower script is to strip off the speaker labels and to copy those lines into equivalent lines for the follower to follow. So there is one to one correspondence between each line in the follower script and the corresponding line in the caption script. Similarly, for translations, there is a one to one correspondence in each of the lines in each of the translated scripts. If the determined position of the follower (aided by cues and metadata) is line 13 of the follower script, the system puts out line 13 of the caption script.

In the caption delivery system the core speech following engine is balancing the input from the speech follower, the input from the cues, the manually-defined metadata and the pre-captured timeline to achieve following by:
  Responding to synchronising (rather than instructing) cues as firm (hard) waypoints
  Proceeding between the waypoints based on using speech following localisation, known to be less than 100% perfect due to the poor audio environment [using known techniques to give this the best possible chance, (a) by audio compression and (b) by seeding the speech recogniser with only the vocabulary of the script and (c) by modifying the follower script to phoneticize or adjust it to match more closely with what the follower thinks it is hearing]
  Guiding interpretation of speech following "hits" with knowledge of expected rate of delivery (i.e. stops it leaping too far ahead or too far behind; knows it should be progressing forwards) and with some built-in elasticity to allow a degree of uncertainty due to the less than 100% perfect recognition in these circumstances
  Able to be relocalised if necessary using nudges

The invention claimed is:

1. A caption delivery system for displaying captions during a live performance in theatre, the system comprising:
  a memory component storing a follower script and a caption script, the follower script including waypoints associated with event related stage cues associated with the live performance;
  a speech detection module, comprising a processor, configured to detect spoken dialogue delivered by actors;
  a speech follower component, comprising a processor, operable to recognize the detected spoken dialogue and to compare the detected spoken dialogue with the follower script to track the location in the follower script of the detected spoken dialogue to identify when a caption is to be displayed;
  a caption output module, comprising a processor, configured to access from the caption script the caption for display at each location in the follower script associated with a caption; and
  a cue handler component, comprising a processor and memory, which stores cue identifiers with associated cue metadata and which is configured to receive event related stage cues detected in the live performance and output cue signals to the speech follower component to thereby assist the speech follower component to determine the location based on the waypoints at the detected cues;
  wherein the cue metadata comprises a category of cue metadata that causes a control signal to be generated to the speech detection module to turn off the speech detection module when speech is not expected at a time in the live performance, and to turn on the speech detection module when speech is expected at a time in the live performance.

2. A caption delivery system according to claim 1, wherein the follower script comprises non-cue metadata corresponding to events in the live performance and usable to assist in tracking the location of the live performance relative to the follower script.

3. A caption delivery system according to claim 1, wherein the cue metadata comprises a category of cue metadata that causes a control signal to be provided to the caption output module to trigger the display of a non-dialogue caption which is associated with that cue.

4. A caption delivery system according to claim 1, comprising a caption distribution module, comprising a processor, configured to receive captions from the caption output module and to generate caption messages for display.

5. A caption delivery system according to claim 4, wherein the memory component stores a first follower script for a first performance and an associated first caption script for the first performance, and a second follower script for a second performance and an associated second caption script for the second performance, wherein the caption distribution module generates caption messages for the first and second performances which are occurring at the same time, each in a respective channel with a performance identifier associated with the caption messages for that performance.

6. A caption delivery system according to claim 4, wherein the caption distribution module generates the caption output messages in a format which defines color and style of font for display.

7. A caption delivery system according to claim 4, wherein the caption distribution module is configured to generate caption messages in which the text of a caption for display is defined in plain text form.

8. A caption delivery system according to claim 4, wherein the caption distribution module is configured to create caption messages which define at least one of a background color and foreground color for display of the text.

9. A caption delivery system according to claim 4, wherein the memory component stores a translation script which stores for each entry in the follower script a caption in a language other than the language in which the performance is being delivered.

10. A caption delivery system according to claim 1, wherein the memory component stores an audio script which identifies at each of a plurality of timepoints in the follower script an audio recording to be played at those points.

11. A caption delivery system according to claim 1, which comprises a plurality of display devices each equipped with a receiver for receiving caption messages with captions for display, and the display for showing the captions to a user of the receiving device.

12. A caption delivery system according to claim 11, wherein the receiving devices are glasses.

13. A caption delivery system according to claim 1, comprising a caption editing module, comprising a processor, arranged to receive performance production script and a timeline for spoken delivery of the script, and to generate from the production script and the timeline of the spoken delivery of the script, the follower script and the caption script.

14. A caption delivery system according to claim 13, wherein the caption editing module is configured to receive manual input during a rehearsal of a live performance to modify production of the follower script and caption script.

15. A method of displaying captions during a liv performance in theatre, the method comprising:
    storing in a computer memory a follower script with entries organized along a timeline, and metadata at timepoints between at least some of the entries, wherein the metadata is associated with stage events in the live performance;
    using a speech recognition system in theatre to detect spoken dialogue delivered by actors and track the detected spoken dialogue at the live performance against the entries in the follower script, and the stage events, to aid in following the live performance;
    wherein the metadata comprises a category of cue metadata that causes a control signal to be generated to the speech recognition system to turn off the speech recognition system when speech is not expected at a time in the live performance, and to turn on the speech recognition system when speech is expected at a time in the live performance; and
    transmitting information from a computer to a viewer output device to be output to a viewer of the live performance in theatre, the information output being at least one of displayed text and an audio description at predefined times in the live performance relative to stage events.

* * * * *